(12) United States Patent
Bueno Buoro et al.

(10) Patent No.: US 11,073,417 B2
(45) Date of Patent: Jul. 27, 2021

(54) DATA DRIVEN VISUALIZATION OF UNCERTAINTY IN FLOW MEASUREMENTS

(71) Applicant: International Business Machines Corporation, Armonk, NY (US)

(72) Inventors: Alvaro Bueno Buoro, Rio de Janeiro (BR); Paul Borrel, New York, NY (US); Daniel Specht Menezes, Rio de Janeiro (BR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 399 days.

(21) Appl. No.: 16/203,734

(22) Filed: Nov. 29, 2018

(65) Prior Publication Data
US 2020/0173831 A1 Jun. 4, 2020

(51) Int. Cl.
*G01F 7/00* (2006.01)
*G06F 17/13* (2006.01)

(52) U.S. Cl.
CPC ............. *G01F 7/00* (2013.01); *G06F 17/13* (2013.01)

(58) Field of Classification Search
CPC . G01F 7/00; G06F 17/13; G06F 17/00; G01P 5/001; G01P 5/00
See application file for complete search history.

(56) References Cited

U.S. PATENT DOCUMENTS

| 7,870,793 B1* | 1/2011 | Feller | G01F 1/667 73/861.27 |
| 2005/0124885 A1* | 6/2005 | Abend | G01S 15/8993 600/443 |
| 2009/0019914 A1 | 1/2009 | Winchester | |

(Continued)

FOREIGN PATENT DOCUMENTS

CN 101430241 A 5/2009

OTHER PUBLICATIONS

Gonzales-Castro et al.; "Framework for Estimating Uncertainty of ADCP Measurements from a Moving Boat by Standardized Uncertainty Analysis"; Journal of Hydraulic Engineering © ASCE; Dec. 2007; 21 pages.

(Continued)

*Primary Examiner* — Mohamed Charioui
(74) *Attorney, Agent, or Firm* — Cantor Colburn LLP; Joseph Petrokaitis

(57) ABSTRACT

A computer-implemented method for visualizing uncertainty in flow measurements is provided. A non-limiting exemplary method includes reading, by a processor, a plurality of fluid flow measurements having a magnitude, a direction, and a location. The method plots a plurality of points on a first polar graph, each point representing the difference in fluid flow measurements between two of the plurality of fluid flow measurements at different locations and calculates an uncertainty boundary line based on the plurality of plotted points. The method filters, by the processor, the plurality of plotted points to remove plotted (Continued)

points outside of the uncertainty boundary line leaving only remaining plotted points and defines at least one cluster of remaining plotted points based on similar behavior of a subset of the remaining plotted points. The method may use the remaining plotted points to provide adaptive setup to tune a response in the fluid flow measurements.

14 Claims, 8 Drawing Sheets

(56) References Cited

U.S. PATENT DOCUMENTS

2016/0202098 A1 7/2016 Brown et al.
2018/0073902 A1* 3/2018 Gonzaga .................. G01F 1/76

OTHER PUBLICATIONS

Rennie; "Uncertainty of ADCP spatial velocity distributions"; 6th International Symposium on Ultrasonic Doppler Methods for Fluid Mechanics and Fluid Engineering; Czech Technical University, Prague, Czech Republic, Sep. 9-11, 2008; 4 pages.
Schafer; "Quantifying measurement uncertainties in ADCP measurements in non-steady, inhomogeneous flow" (Abstract Only); Geophysical Research Abstracts, vol. 19, 2017; 1 page.

* cited by examiner $Magnitude_{inv} = a(b - \cos alfa)$ where $Magnitude_{inv}$ is the magnitude with a maximum in the center of the polar plot 500, α is the angle of the difference between two neighboring fluid flow measurements, and a and b are parameters of the equation that will then fit the line to exclude the uncertainty zone of the polar plot

DATA DRIVEN VISUALIZATION OF UNCERTAINTY IN FLOW MEASUREMENTS

BACKGROUND

The present invention generally relates to flow measurements, and more specifically, to data driven visualization of uncertainty in flow measurements.

Measuring fluid flow in open spaces, such as lakes, or in other environments, such as blood veins, at high spatial and temporal resolution is a challenge because fluid flow varies over location and time. A common technique to measure flow in high density information is through the use of the Doppler effect, but this has a high rate of error.

SUMMARY

Embodiments of the present invention are directed to a computer-implemented method for visualizing uncertainty in flow measurements. A non-limiting example of the computer-implemented method includes reading, by a processor, a plurality of fluid flow measurements having a magnitude, a direction, and a location. The computer-implemented method plots, by the processor, a plurality of points on a first polar graph, each point representing the difference in fluid flow measurements between two of the plurality of fluid flow measurements at different locations and calculates, by the processor, an uncertainty boundary line based on the plurality of plotted points. The computer-implemented method filters, by the processor, the plurality of plotted points to remove plotted points outside of the uncertainty boundary line to leave only remaining plotted points and defines, by the processor, at least one cluster of remaining plotted points based on similar behavior of a subset of the remaining plotted points. The computer-implemented method presents, by the processor, the one cluster of remaining plotted points on a second polar graph.

Embodiments of the present invention are directed to a system for visualizing uncertainty in flow measurements. A non-limiting example of the system includes a memory and a processor coupled to the memory. The processor is operable to execute instructions stored in the memory. The instructions cause the processor to read a plurality of fluid flow measurements having a magnitude, a direction, and a location. The instructions cause the processor to plot a plurality of points on a first polar graph, each point representing the difference in fluid flow measurements between two of the plurality of fluid flow measurements at different locations and calculate an uncertainty boundary line based on the plurality of plotted points. The processor filters the plurality of plotted points to remove plotted points outside of the uncertainty boundary line to leave only remaining plotted points and defines at least one cluster of remaining plotted points based on similar behavior of a subset of the remaining plotted points. The instructions cause the processor to present the one cluster of remaining plotted points on a second polar graph.

Embodiments of the invention are directed to a computer program product for visualizing uncertainty in flow measurements, the computer program product comprising a computer readable storage medium having program instructions embodied therewith. The program instructions are executable by a processor to cause the processor to perform a method. A non-limiting example of the method includes reading a plurality of fluid flow measurements having a magnitude, a direction, and a location. The method plots a plurality of points on a first polar graph, each point representing the difference in fluid flow measurements between two of the plurality of fluid flow measurements at different locations and calculates an uncertainty boundary line based on the plurality of plotted points. The method filters the plurality of plotted points to remove plotted points outside of the uncertainty boundary line to leave only remaining plotted points and defines at least one cluster of remaining plotted points based on similar behavior of a subset of the remaining plotted points. The method presents the one cluster of remaining plotted points on a second polar graph.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
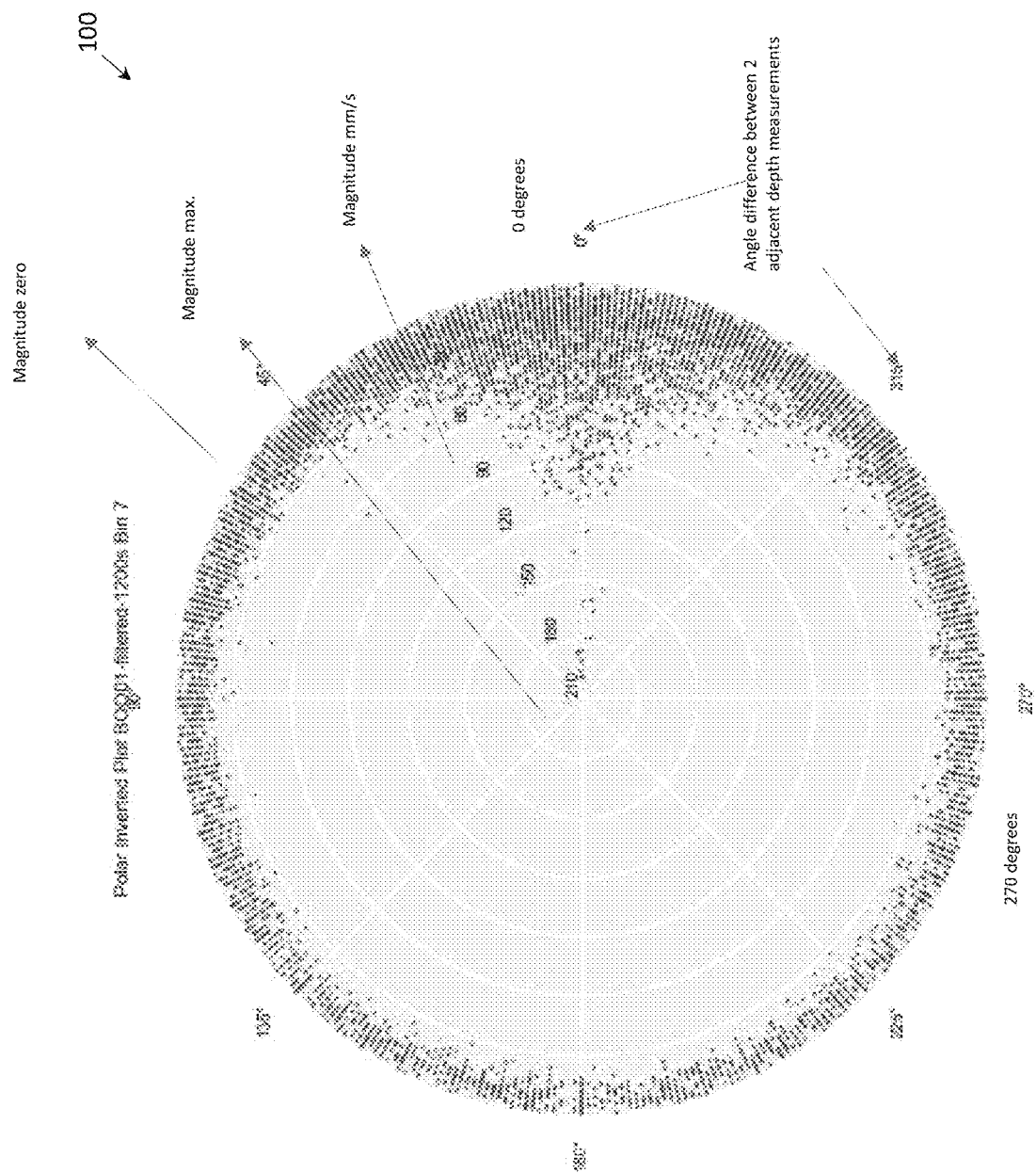
FIG. 1 depicts an exemplary polar plot of fluid flow measurements according to embodiments of the invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, fluid flow measurements commonly use the Doppler effect to measure flow in open spaces, such as lakes, and other environments, such as blood veins. Often, an acoustic Doppler current profiler ("ADCP") is used to measure fluid flow in oceans, rivers, lakes, and other bodies of water. The data collected from an ADCP has a certain degree of error, resulting in uncertainty in fluid flow measurements. The uncertainty of the fluid flow measurement is traditionally associated with inaccuracy of sensors and tuning of the sensors. However, other factors also play a role, such as the heterogeneity of the fluid. This creates additional uncertainty in measurement that are not usually accounted for.

Traditional fluid flow measurements are displayed in separate graphs illustrating the magnitude of the fluid flow and the direction of the fluid flow. Such graphs provide a use with no indication of the uncertainty of the fluid flow measurements.

Turning now to an overview of the aspects of the invention, one or more embodiments of the invention address the above-described shortcomings of the prior art by providing an improved type of visualization of fluid flow measurements that permits an assessment of the uncertainty of the measurements, regardless of the origin of the measurements.

The above-described aspects of the invention address the shortcomings of the prior art by aggregating fluid flow measurements in a polar representation that is used to define the uncertainty in the measurements. The polar representation contains a plot of the individual fluid flow measurements in combination with a plotted line that indicate the measurements that have a lesser degree of uncertainty. This plot can be used to detect regions of similar flow direction through a process of clusterization. Clusterization is performed after filtering the fluid flow measurements to remove fluid flow measurements that lie within an uncertainty zone.

Turning now to a more detailed description of aspects of the present invention, FIG. 1 depicts an exemplary polar plot of fluid flow measurements according to embodiments of the invention. Each point on the exemplary plot 100 represents a specific location and a specific time that a fluid flow measurement occurs. The plotted point represents the difference between fluid flow measurements at neighboring locations. In the case of fluid flow measurements taken in open space flows, consideration of neighboring depths is also considered for each point. The polar coordinates of a point on the plot are calculated as follows: the angle is proportional to the change in direction between two fluid flow measurements; and, the radius is proportional to the inverse of the average of the velocities among the neighboring locations of the fluid flow measurements. In practice, the closer a plotted point is to the center of the plot, the higher the velocity of the flows.

Figure 2:
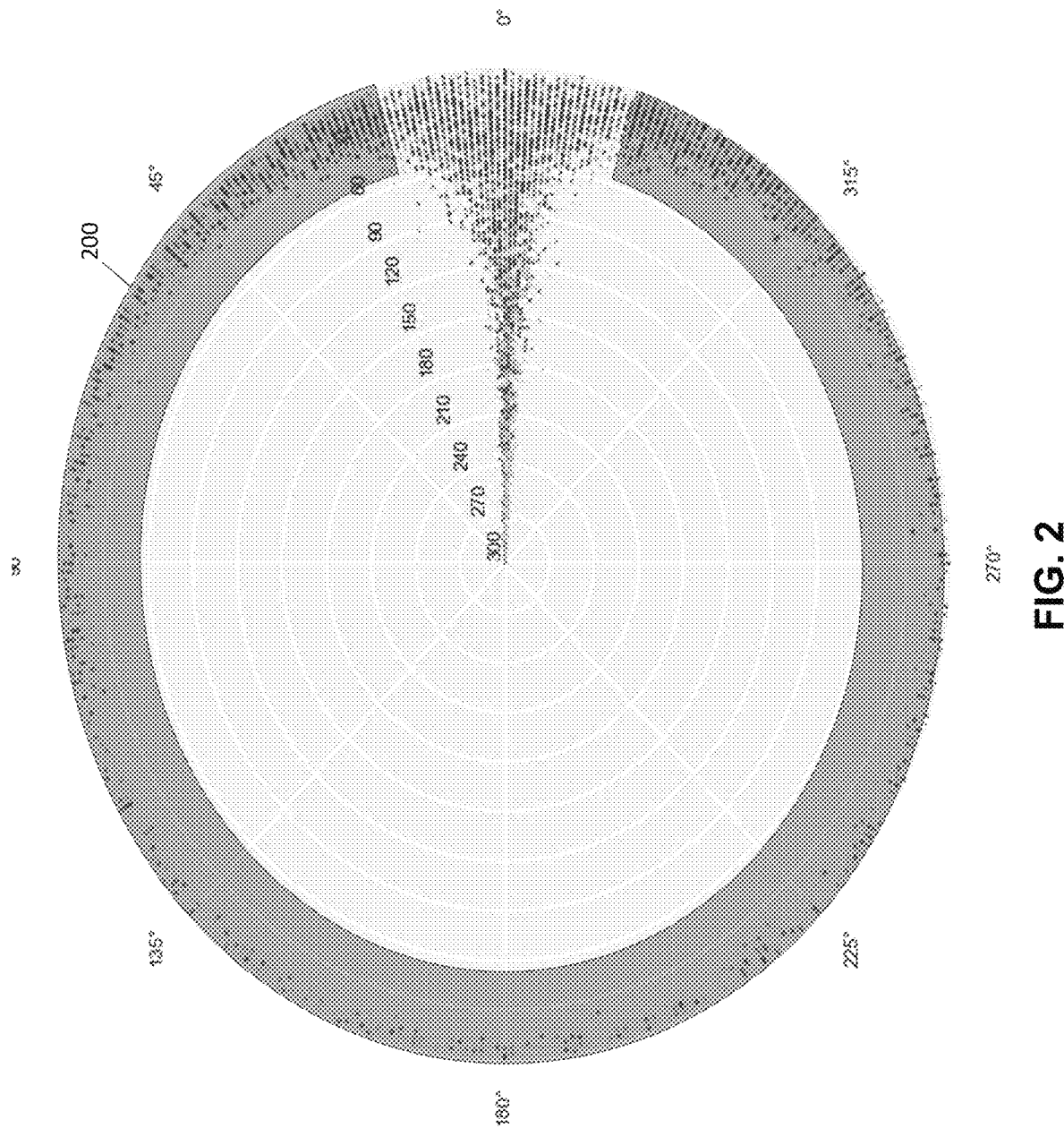
FIG. 2 depicts an exemplary polar plot of fluid flow measurements with a highlighted zone of uncertainty according to embodiments of the invention.

FIG. 2 depicts an exemplary polar plot of fluid flow measurements with a highlighted zone of uncertainty according to embodiments of the invention. Within each plot is a zone of uncertainty 200. The zone of uncertainty is where the velocity of the fluid flows are low and the directions of the fluid flow are not consistent across neighboring locations as would ordinarily be expected. These points within the zone of uncertainty 200 suggest a slow and uncertain motion of the fluid being measured.

Figure 3:
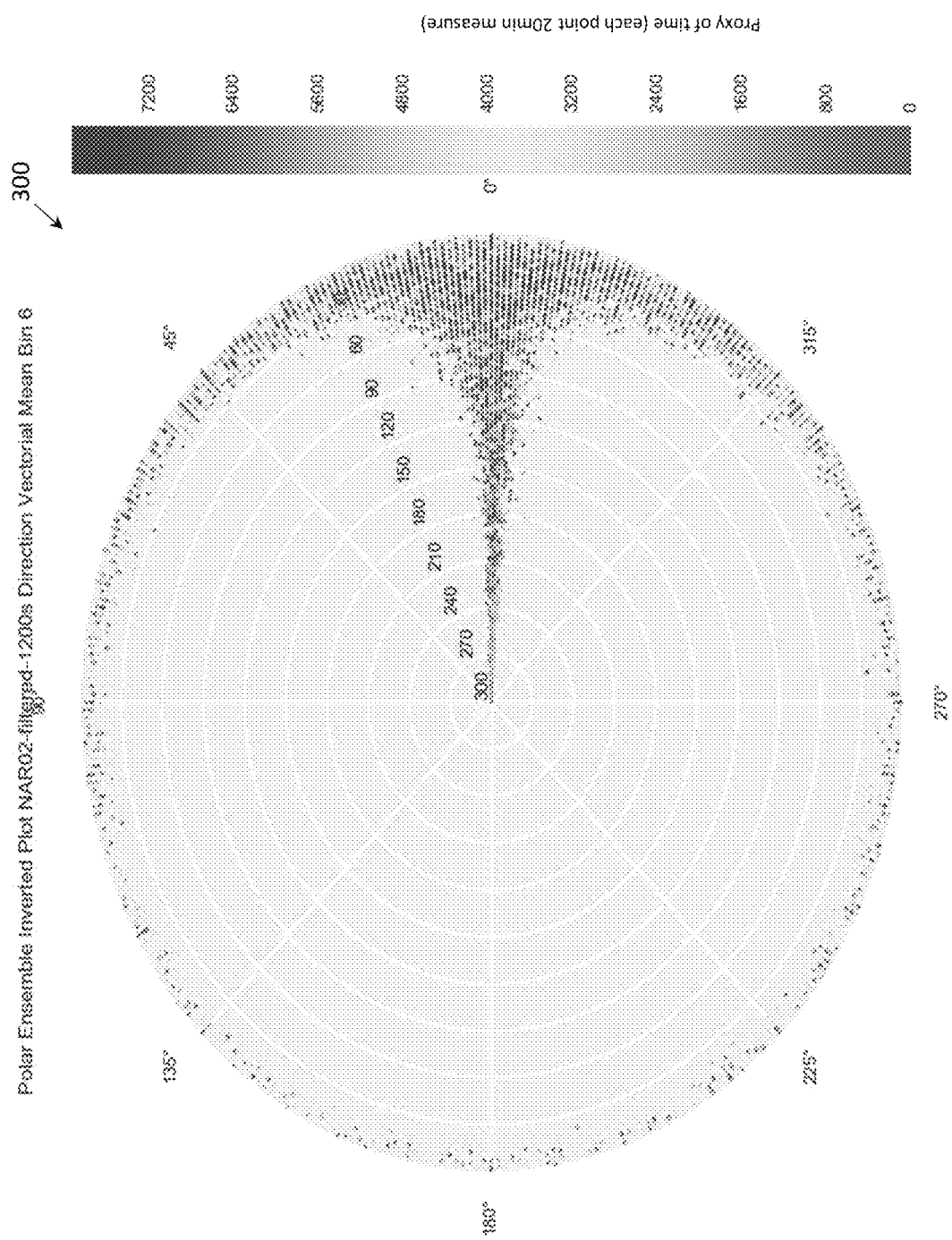
FIG. 3 depicts an exemplary polar plot of fluid flow measurements that represent the same location at different times according to embodiments of the invention.

FIG. 3 depicts an exemplary polar plot of fluid flow measurements that represent the same location at different times according to embodiments of the invention. Exemplary plot 300 is another exemplary plot of fluid flow measurements plotted as described with respect to FIG. 1. In this exemplary plot, the smaller uncertainty fluid flow measurements are primarily found in the zone closes to the center of the exemplary plot.

Figure 4:
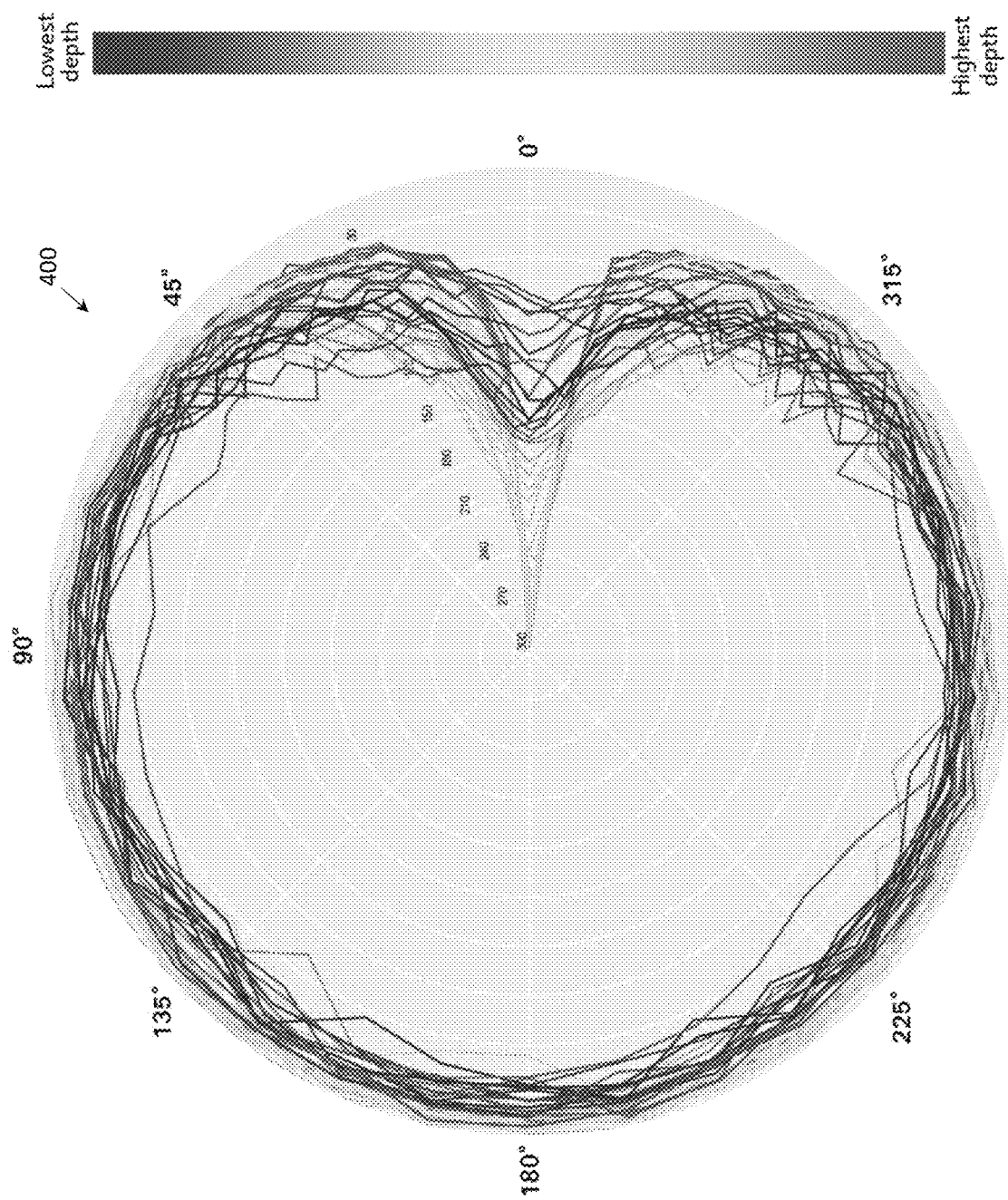
FIG. 4 depicts an exemplary polar plot of fluid flow measurements represented as lines of similar locations according to embodiments of the invention.

FIG. 4 depicts an exemplary polar plot of fluid flow measurements represented as lines of similar locations according to embodiments of the invention. Exemplary polar plot 400 illustrates a series of lines, where each line represents fluid flow measurements taken in the same or about the same location. In this exemplary plot 400, the different lines represent different depths in the fluid being measured. The lines represent the 98% envelop of the points at each angular difference of direction. The shades of the lines represent the depths of the measurements from the top of the fluid body to the bottom of the fluid body.

Figure 5:
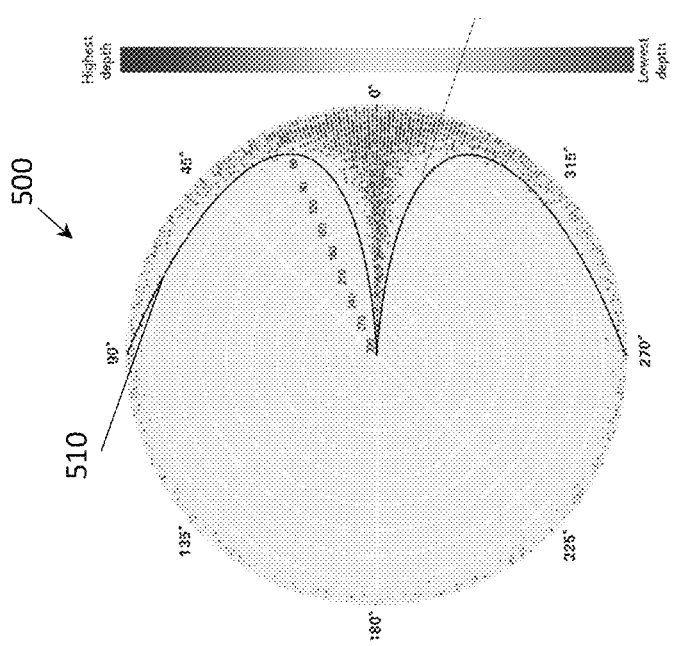
FIG. 5 depicts an exemplary polar plot of fluid flow measurements along with an uncertainty boundary line according to embodiments of the invention.

FIG. 5 depicts an exemplary polar plot of fluid flow measurements along with an uncertainty boundary line according to embodiments of the invention. A plot of fluid flow measurements is illustrated in polar plot 500, along with a calculated uncertainty boundary line 510. Uncertainty boundary line 510 is calculated according to the equation:

$$\text{Magnitude}_{inv} = a(b - \cos(\alpha)),$$

where $\text{Magnitude}_{inv}$ is the magnitude with a maximum in the center of the polar plot 500, $\alpha$ is the angle of the difference between two neighboring fluid flow measurements, and a and b are parameters of the equation that will then fit the line to exclude the uncertainty zone of the polar plot 500.

The uncertainty boundary line 510 therefore defines a region that can be used to filter out the uncertainty zone. This provides a precise description of the data driven uncertainty via the parameters of the above equation. The parameters of the above equation may be found by numerical methods, for example, a minimum root square error method. For example in polar plot 500, considering an acceptable error of 20 degrees, the directions obtained associated with a magnitude under 50 mm/s should be considered to have an uncertain direction.

Using this uncertainty boundary line 510 as a filter, a method can filter out the outlying points, i.e., those outside of the uncertainty boundary line 510 and in the uncertainty zone. Integrating a cluster with the use of spatial position as an additional parameter, the method can predefine a number of classes for interpretation. For example, 3 classes of depth may be defined. The method can also define a time window for analysis, e.g., one day, and numerically define by cluster a spatial separation that best separates the behavior of the clusters, e.g. different directions of flow.

Figure 6:
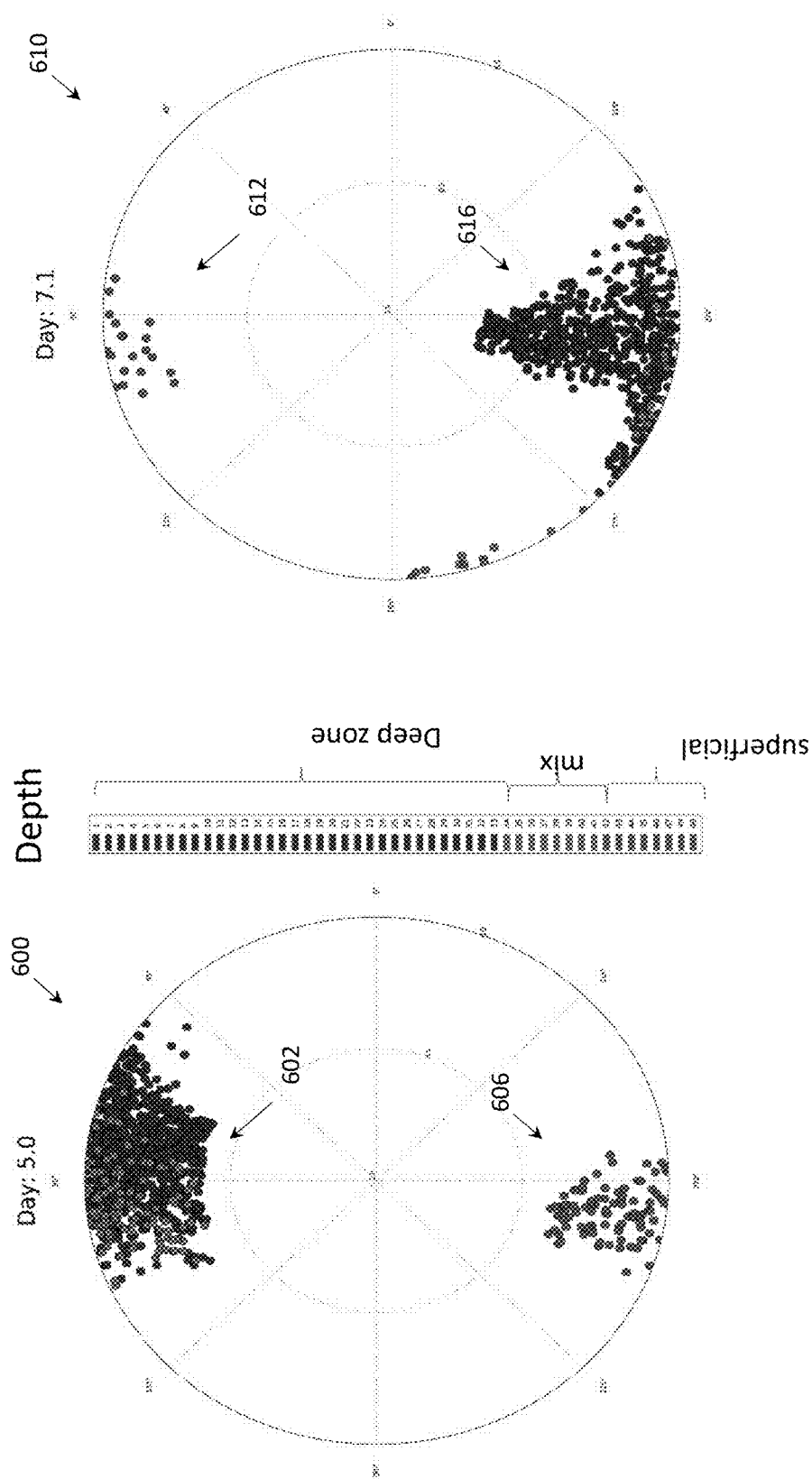
FIG. 6 depicts exemplary polar plots of clusterization of fluid flow measurements according to embodiments of the invention.

FIG. 6 depicts exemplary polar plots of clusterization of fluid flow measurements according to embodiments of the invention. Exemplary polar plots 600 and 610 illustrate polar plots of clustered fluid flows. Polar plot 600 represents clusters of flows 602 and 606 at different depths, with cluster 602 being at a deep zone and cluster 606 being at a superficial depth on day 5 in a series of days of measurements. Polar plot 610 represents clusters of flows 612 and 616 at different depths, with cluster 612 being at a superficial zone and cluster 616 being at a deep depth on day 7.1 in a series of days of measurements. These clusters are detected based on the clusterization made available by the previously described plotting and filtering techniques. The size of each cluster is defined for each cluster based on the direction and spatial positioning of the fluid flow measurements following filtering out of the uncertainty zone using the uncertainty boundary line.

Sensor control unity can dynamically use the above filtering technique to provide adaptive setup to fine tune optimal response in fluid flow measurements. This can be implemented based on: definition of a time window for the integration of the fluid flow measurements as defined previously; identification, for each initial spatial cluster, of its accuracy to find less accurate zone; and dynamic adaptive setup of a sensor to improve the accuracy within its zone. This can be useful when environmental conditions that are spatially variable influence the quality of the measurements, for example, specific turbidity zones or variable temperature or salinity zones in a liquid column which impacts the density and the Doppler precision of fluid flow measurements. This can occur with pollution plumes as oil spills, salt or heat intrusion in lakes, ocean, and rivers near nuclear power plants, for example.

Figure 7:
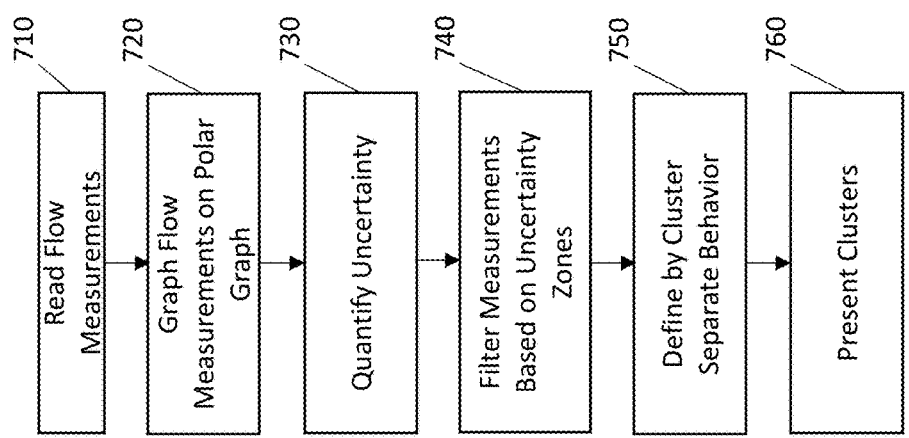
FIG. 7 illustrates an exemplary flowchart of a method of filtering and presenting data according to embodiments of the invention.

FIG. 7 illustrates an exemplary flowchart of a method of filtering and presenting data according to embodiments of the invention. A series of fluid flow measurements are read by a flowmeter, such as an ADCP over a period of times and/or locations. (stage 710). The flow measurements are plotted on a polar graph. (stage 720). The plotted point represents the difference between fluid flow measurements at neighboring locations. In the case of fluid flow measurements taken in open space flows, consideration of neighboring depths is also considered for each point. The polar coordinates of a point on the plot are calculated as follows: the angle is proportional to the change in direction between two fluid flow measurements; and, the radius is proportional to the inverse of the average of the velocities among the neighboring locations of the fluid flow measurements.

The zone of uncertainty is determined. (stage 730). The zone of uncertainty is calculated as that zone outside of an uncertainty boundary line. The uncertainty boundary line is calculated based on the equation provided previously. Flow measurements outside of the uncertainty boundary line are filtered out of the polar plot. (stage 740). Based on behavior of the remaining plotted points, clusters are defined. (stage 750). The clusters are presented to a user in additional polar plots. (stage 760).

Figure 8:
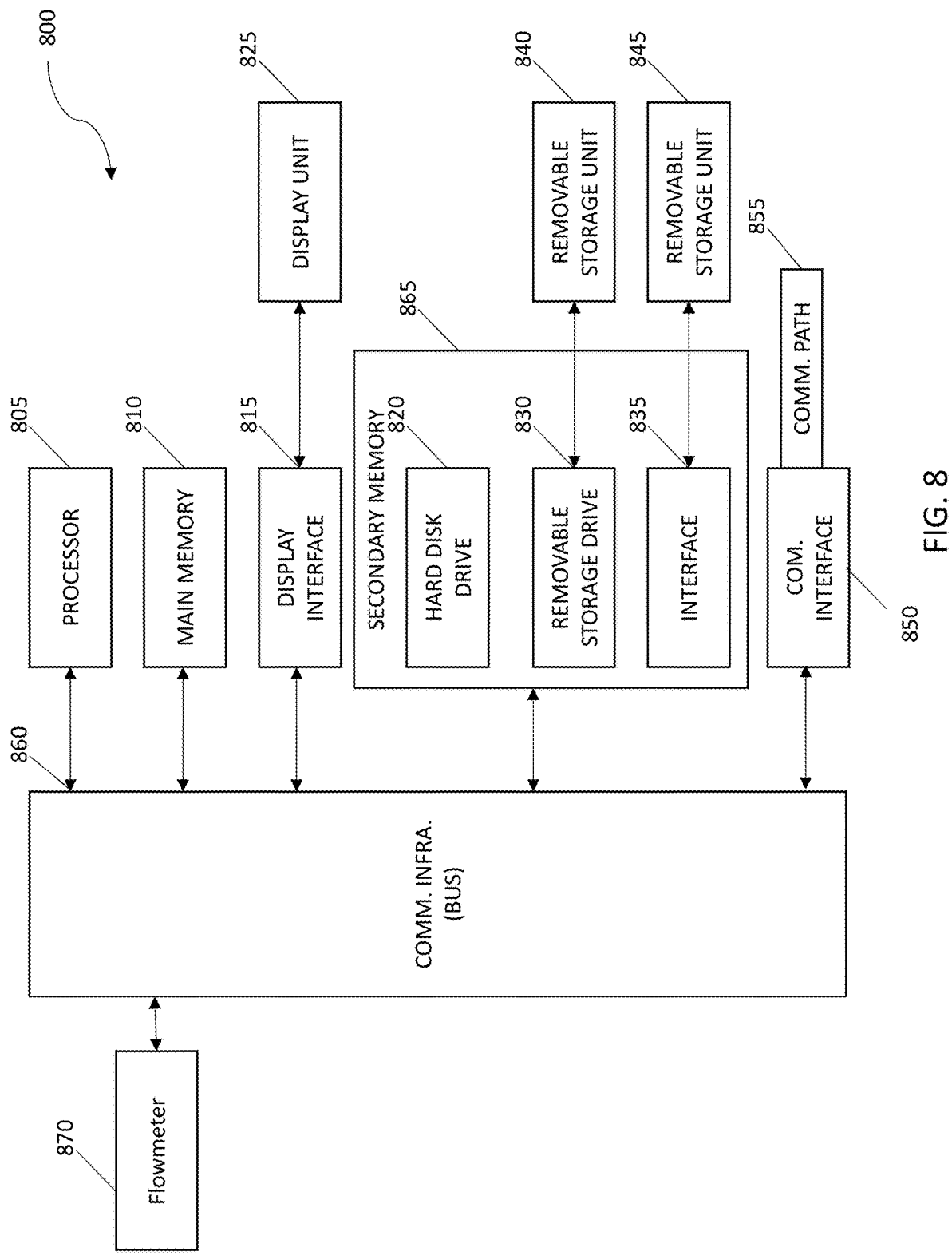
FIG. 8 depicts details of an exemplary computing system capable of implementing aspects of the invention.

FIG. 8 depicts details of an exemplary computing system capable of implementing aspects of the invention. FIG. 8 depicts a high level block diagram computer system 800, which can be used to implement one or more aspects of the present invention. Computer system 800 may act as a media device and implement the totality of the invention or it may act in concert with other computers and cloud-based systems to implement the invention. More specifically, computer system 800 can be used to implement some hardware components of embodiments of the present invention. Although one exemplary computer system 800 is shown, computer system 800 includes a communication path 855, which connects computer system 800 to additional systems (not depicted) and can include one or more wide area networks (WANs) and/or local area networks (LANs) such as the Internet, intranet(s), and/or wireless communication network(s). Computer system 800 and additional system are in communication via communication path 855, e.g., to communicate data between them.

Computer system 800 includes one or more processors, such as processor 805. Processor 805 is connected to a communication infrastructure 860 (e.g., a communications bus, cross-over bar, or network). Computer system 800 can include a display interface 815 that forwards graphics, text, and other data from communication infrastructure 860 (or from a frame buffer not shown) for display on a display unit 825. Computer system 800 also includes a main memory 810, preferably random access memory (RAM), and can also include a secondary memory 865. Secondary memory 865 can include, for example, a hard disk drive 820 and/or a removable storage drive 830, representing, for example, a floppy disk drive, a magnetic tape drive, or an optical disk drive. Removable storage drive 830 reads from and/or writes to a removable storage unit 840 in a manner well known to those having ordinary skill in the art. Removable storage unit 840 represents, for example, a floppy disk, a compact disc, a magnetic tape, or an optical disk, etc. which is read by and written to by removable storage drive 830. As will be appreciated, removable storage unit 840 includes a computer readable medium having stored therein computer software and/or data.

In alternative embodiments, secondary memory 865 can include other similar means for allowing computer programs or other instructions to be loaded into the computer system. Such means can include, for example, a removable storage unit 845 and an interface 835. Examples of such means can include a program package and package interface (such as that found in video game devices), a removable memory chip (such as an EPROM, or PROM) and associated socket, and other removable storage units 845 and interfaces 835 which allow software and data to be transferred from the removable storage unit 845 to computer system 800. In addition, a camera 870 is in communication with processor 805, main memory 810, and other peripherals and storage through communications interface 860.

Computer system 800 can also include a communications interface 850. Communications interface 850 allows software and data to be transferred between the computer system and external devices. Examples of communications interface 850 can include a modem, a network interface (such as an Ethernet card), a communications port, or a PCM-CIA slot and card, etcetera. Software and data transferred via communications interface 850 are in the form of signals which can be, for example, electronic, electromagnetic, optical, or other signals capable of being received by communications interface 850. These signals are provided to communications interface 850 via communication path (i.e., channel) 855. Communication path 855 carries signals and can be implemented using wire or cable, fiber optics, a phone line, a cellular phone link, an RF link, and/or other communications channels.

In the present description, the terms "computer program medium," "computer usable medium," and "computer readable medium" are used to generally refer to media such as main memory 810 and secondary memory 865, removable storage drive 830, and a hard disk installed in hard disk drive 820. Computer programs (also called computer control logic) are stored in main memory 810 and/or secondary memory 865. Computer programs can also be received via communications interface 850. Such computer programs, when run, enable the computer system to perform the features of the present invention as discussed herein. In particular, the computer programs, when run, enable processor 805 to perform the features of the computer system. Accordingly, such computer programs represent controllers of the computer system.

Many of the functional units described in this specification have been labeled as modules. Embodiments of the present invention apply to a wide variety of module implementations. For example, a module can be implemented as a hardware circuit comprising custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like.

Modules can also be implemented in software for execution by various types of processors. An identified module of executable code can, for instance, include one or more physical or logical blocks of computer instructions which can, for instance, be organized as an object, procedure, or function. Nevertheless, the executables of an identified module need not be physically located together, but can include disparate instructions stored in different locations which, when joined logically together, comprise the module and achieve the stated purpose for the module.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
reading, by a processor, a plurality of fluid flow measurements having a magnitude, a direction, and a location;
plotting, by the processor, a plurality of points on a first polar graph, each point representing the difference in fluid flow measurements between two of the plurality of fluid flow measurements at different locations;
calculating, by the processor, an uncertainty boundary line based on the plurality of plotted points;
filtering, by the processor, the plurality of plotted points to remove plotted points outside of the uncertainty boundary line to leave only remaining plotted points;
defining, by the processor, at least one cluster of remaining plotted points based on similar behavior of a subset of the remaining plotted points; and
presenting, by the processor, the one cluster of remaining plotted points on a second polar graph,
wherein the remaining plotted points are used to provide adaptive setup to tune a response in the fluid flow measurements, and
wherein the tuning is used to enhance the accuracy of a fluid flow measurement sensor within a zone.

2. The computer-implemented method of claim 1, wherein the uncertainty boundary line is calculated according to the equation $$\text{Magnitude}_{inv} = a(b - \cos(\alpha)),$$

where $\text{Magnitude}_{inv}$ is a magnitude with a maximum in a center of the first polar plot, $\alpha$ is the angle of the difference between two neighboring fluid flow measurements within the plurality of fluid flow measurements, and a and b are parameters of the equation that fits the uncertainty boundary line to exclude an uncertainty zone within the first polar plot.

3. The computer-implemented method of claim 1, wherein the behavior of a subset of the remaining plotted points comprises a direction of flow.

4. The computer-implemented method of claim 1, wherein the tuning is based on a time window for integration of the fluid flow measurements.

5. The computer-implemented method of claim 1, where a plotting angle is proportional to a change in direction between two fluid flow measurements among the plurality of fluid flow measurements and a plotting radius is proportional to an inverse of an average of the velocities in two fluid flow measurements.

6. A system comprising:
a memory; and
a processor coupled to the memory, the processor operable to execute instructions stored in the memory, the instructions causing the processor to:
read a plurality of fluid flow measurements having a magnitude, a direction, and a location;
plot a plurality of points on a first polar graph, each point representing the difference in fluid flow measurements between two of the plurality of fluid flow measurements at different locations;
calculate an uncertainty boundary line based on the plurality of plotted points;
filter the plurality of plotted points to remove plotted points outside of the uncertainty boundary line to leave only remaining plotted points;

define at least one cluster of remaining plotted points based on similar behavior of a subset of the remaining plotted points; and present the one cluster of remaining plotted points on a second polar graph, wherein the remaining plotted points are used to provide adaptive setup to tune a response in the fluid flow measurements, and wherein the tuning is used to enhance the accuracy of a fluid flow measurement sensor within a zone.

7. The system of claim 6, wherein the uncertainty boundary line is calculated according to the equation $$Magnitude_{inv} = a(b - \cos(\alpha)),$$

where $Magnitude_{inv}$ is a magnitude with a maximum in a center of the first polar plot, $\alpha$ is the angle of the difference between two neighboring fluid flow measurements within the plurality of fluid flow measurements, and a and b are parameters of the equation that fits the uncertainty boundary line to exclude an uncertainty zone within the first polar plot.

8. The system of claim 6, wherein the behavior of a subset of the remaining plotted points comprises a direction of flow.

9. The system of claim 6, wherein the tuning is based on a time window for integration of the fluid flow measurements.

10. The system of claim 6, where a plotting angle is proportional to a change in direction between two fluid flow measurements among the plurality of fluid flow measurements and a plotting radius is proportional to an inverse of an average of the velocities in two fluid flow measurements.

11. A computer program product for visualizing flow measurements, the computer program product comprising a computer readable storage medium having program instructions embodied therewith, the program instructions executable by a computer, to cause the computer to perform a method comprising:

reading a plurality of fluid flow measurements having a magnitude, a direction, and a location;

plotting a plurality of points on a first polar graph, each point representing the difference in fluid flow measurements between two of the plurality of fluid flow measurements at different locations;

calculating an uncertainty boundary line based on the plurality of plotted points;

filtering the plurality of plotted points to remove plotted points outside of the uncertainty boundary line to leave only remaining plotted points;

defining at least one cluster of remaining plotted points based on similar behavior of a subset of the remaining plotted points; and presenting the one cluster of remaining plotted points on a second polar graph, wherein the remaining plotted points are used to provide adaptive setup to tune a response in the fluid flow measurements, and wherein the tuning is used to enhance the accuracy of a fluid flow measurement sensor within a zone.

12. The computer program product of claim 11, wherein the uncertainty boundary line is calculated according to the equation $$Magnitude_{inv} = a(b - \cos(\alpha)),$$

where $Magnitude_{inv}$ is a magnitude with a maximum in a center of the first polar plot, $\alpha$ is the angle of the difference between two neighboring fluid flow measurements within the plurality of fluid flow measurements, and a and b are parameters of the equation that fits the uncertainty boundary line to exclude an uncertainty zone within the first polar plot.

13. The computer program product of claim 11, wherein the behavior of a subset of the remaining plotted points comprises a direction of flow.

14. The computer program product of claim 11, wherein the tuning is based on a time window for integration of the fluid flow measurements.

* * * * *